US007645415B2

United States Patent
Hach

(10) Patent No.: US 7,645,415 B2
(45) Date of Patent: Jan. 12, 2010

(54) ELASTOMER FILM FOR HYGIENE ARTICLES

(75) Inventor: Maik Hach, Mount Orab, OH (US)

(73) Assignee: Nordenia Technologies GmbH, Gronau (DE)

( * ) Notice: Subject to any disclaimer, the term of this patent is extended or adjusted under 35 U.S.C. 154(b) by 335 days.

(21) Appl. No.: 11/895,648

(22) Filed: Aug. 24, 2007

(65) Prior Publication Data
US 2008/0051509 A1   Feb. 28, 2008

(30) Foreign Application Priority Data
Aug. 26, 2006   (DE)   ........................ 10 2006 040 181

(51) Int. Cl.
*C08J 3/28* (2006.01)
*C08L 53/02* (2006.01)
*B29C 35/08* (2006.01)

(52) U.S. Cl. ........................ 264/470; 522/112; 522/121; 525/95

(58) Field of Classification Search .................... 525/95; 264/470; 522/121, 112
See application file for complete search history.

(56) References Cited

U.S. PATENT DOCUMENTS

| 6,733,700 B2 * | 5/2004 | Houston et al. ............... 264/1.1 |
| 6,884,480 B2 * | 4/2005 | Bradfute et al. ............ 428/34.9 |
| 7,156,944 B2 * | 1/2007 | Moeller et al. ........... 156/275.5 |

FOREIGN PATENT DOCUMENTS

| EP | 1 228 144 B1 | 8/2006 |
| WO | WO 01/19916 | 3/2001 |
| WO | WO 2004/005398 A1 | 1/2004 |

* cited by examiner

*Primary Examiner*—Susan W Berman
(74) *Attorney, Agent, or Firm*—Collard & Roe, P.C.

(57) ABSTRACT

An elastic film, particularly for hygiene articles, has at least one layer that is produced extrusion of an elastomer polymer composition and subsequently cross-linked. The elastomer polymer composition contains a mixture of 40 to 90 parts by weight of a styrene block copolymer, 5 to 50 parts by weight of a plasticizer oil, and up to 10 parts by weight of a thermoplastic polymer. The layer of the elastomer polymer composition is cross-linked by treatment with electron beams. The elastomer polymer composition additionally contains 2 to 20 parts by weight of a reactive plasticizer that has a mole mass of less than 10,000 kg/kmol, is compatible with soft segments of the styrene block copolymer, and has functional acrylate groups.

11 Claims, No Drawings

ELASTOMER FILM FOR HYGIENE ARTICLES

BACKGROUND OF THE INVENTION

1. Field of the Invention

The invention relates to a film, particularly for hygiene articles, having at least one layer that is produced by extrusion of an elastomer polymer composition and subsequently cross-linked. The elastomer polymer composition contains 40 to 90 parts by weight of a styrene block copolymer, 5 to 50 parts by weight of a plasticizer oil, and up to 10 parts by weight of a thermoplastic polymer. The layer formed by extrusion of the elastomer polymer composition is cross-linked by treatment with electron beams.

2. The Prior Art

An elastic film having the characteristics described is known from European Patent No. EP 1 228 144 B1. The thermoplastic polymers of the elastomer polymer composition consist of polymers that are compatible either with hard segments or with soft segments of the styrene block copolymer. The thermoplastic polymers promote three-dimensional cross-linking during the subsequent electron beam treatment. However, there is a need to further improve the degree of cross-linking and thereby also the physical properties of the elastic film. An elastic film that can absorb great forces and is characterized by little tendency to creep is desired.

An elastic film is known from International Application NO. WO 2004/005398 A1, which has a thermoplastic cover layer and an elastomer layer of a material that can be cross-linked with UV. In order to allow cross-linking by means of UV beams, the polymer composition of the elastomer layer must contain substances that act as photoinitiators, in a proportion of up to 60 wt.-%. During irradiation of the photoinitiators, free radicals are produced, which remove hydrogen, i.e. hydrogen ions, from the polymer chains of the elastomer layer. Different polymer chains can connect at the breakage points, thereby cross-linking the elastomer layer and improving the elastic and mechanical properties. However, during the decomposition of the photoinitiators under the UV irradiation, components having a low molecular weight, which can be physiologically harmful, can be produced and can migrate out of the film. Frequently, an undesirable odor also occurs, which is attributable to the photoinitiators, i.e. to their fragments. From the aspect of production technology, it is disadvantageous that when a photoinitiator is used, partial cross-linking of the polymer material made available for extrusion can already take place by means of natural UV radiation, thereby making extrusion significantly more difficult or even impossible. Furthermore, UV radiation sources have a high need for energy and are prone to failure during mass production.

SUMMARY OF THE INVENTION

With this background, it is an object of the invention to provide an elastic film that has great tensile strength, as the result of a high cross-linking density, and the elastic properties of which do not change under long-term stress.

Proceeding from an elastic film having the characteristics described initially, this task is accomplished, according to the invention, in that the elastomer polymer composition additionally contains 2 to 20 parts by weight of a reactive plasticizer that has a mole mass of less than 10,000 kg/kmol, is compatible with soft segments of the styrene block copolymer, and has functional acrylate groups. The reactive plasticizer used according to the invention is a viscous fluid and not a solid thermoplastic polymer. Oligomers are present, i.e. macromolecules in the transition range between products having a low molecular weight and solid polymers, having a mole mass between approximately $10^2$ and $10^4$ kg/kmol. The reactive plasticizer possesses a chemical base structure that is compatible with the soft segment of the styrene block copolymer. It can be worked into the styrene block copolymer matrix very well, whereby the low molecular weight promotes the miscibility of the reactive plasticizer into the polymer matrix. The cross-linking density can be raised by means of additional acrylate groups.

In terms of their molecular structure, thermoplastic elastomers consist of hard and soft segments, whereby physical linkage points are produced between the hard segments of adjacent polymer chains by means of intermolecular forces, and whereby the soft segments allow reversible elongation as the result of their mobile structure. In this connection, the physical linkage points prevent adjacent molecule chains from slipping off each other, and thereby an irreversible elongation of the film, up to a certain temperature, i.e. up to the point of reaching an elongation limit. Permanent bonds between the molecule chains are formed by means of electron beam cross-linking. A network is formed, thereby achieving greater thermal and chemical resistance. In particular, greater forces can be absorbed in the long term, by means of the additional, strong bonds. Thus, the tendency to tear and/or to form holes can be reduced.

A greater cross-linking density can be achieved during the course of electron beam cross-linking by the addition of the reactive plasticizer described, according to the invention. The greater cross-linking density results in a close-meshed, three-dimensional polymer network, and also guarantees that the reactive plasticizer cannot diffuse out of the styrene block copolymer matrix, and cannot provoke any undesirable skin reactions.

Suitable reactive plasticizers are, in particular, methacrylate-terminated butadiene, multi-functional polyester acrylate, and acrylate polybutadiene, also called high-vinyl butadiene. The reactive plasticizer has a viscosity of less than $10^5$ mPas, measured with a Brookfield viscosimeter at 25° C. According to the invention, a low-viscosity oligomer is preferred, particularly multi-functional polyester acrylates, which are also called hyperbranched acrylates. The films cross-linked with "hyperbranched" reactive plasticizers are characterized by particularly good strength values.

The films according to the invention are suitable for strong stress, for example as closure elements of a diaper. The thickness of the elastic layer of a film that is suitable for diaper closures, for example, lies between 20 μm and 150 μm (micrometers), preferably between 40 μm and 80 μm.

So-called white oils are used as plasticizer oils; these are licensed for medical use. They are preferably aliphatic carbon compounds having a very high degree of purity. The polymer composition can contain up to 10 parts by weight of a thermoplastic polymer. Polymers from the group of polystyrenes, ethylene/vinyl acetate copolymers, or polyolefins can be used as thermoplastic polymers, in order to modify the film properties.

The elastic film can be extruded as a mono-film or co-extruded in multiple layers, and in a preferred embodiment of the invention, the film has at least one outer layer co-extruded with the elastomer polymer composition, made of a polymer from the group of polyethylene, polyethylene copolymer, polypropylene, polypropylene copolymer, or a mixture of these polymers. By arranging a polyolefin layer on at least one side of the elastic layer, the film can easily be connected or laminated with adjacent film layers or non-woven layers during subsequent processing, for example by sealing or gluing. Furthermore, the film is prevented from sticking to itself when it is rolled up, to a great extent, by arranging a polyolefin outer layer. The polyolefin outer layer is preferably thin in comparison with the elastic layer.

Another advantage of the film is that the remaining non-elastic increase in length after elongation is slight. Thus, according to a preferred embodiment of the invention, it is provided that after first elongation of the elastic film by 200% and subsequent relaxation, the non-elastic increase in length is less than 3%. Even after multiple, strong elongation, the elastic properties are retained unchanged, to a great extent.

A method for the production of the film described is also an object of the invention. According to the invention, a layer of the elastomer polymer composition explained above is extruded as a mono-film or co-extruded with at least one additional layer as a multi-layer film. The extruded film is subsequently passed to an electron beam device in which the layer that consists of the elastomer polymer composition is cross-linked by means of irradiation with energy-rich electrons. Conventional extrusion systems can be utilized for the method according to the invention by adding an electron beam device to them. In contrast to a method in which cross-linking takes place by means of UV rays, according to the state of the art, it is not necessary to mix in a photoinitiator. The cross-linking density can be influenced by means of the elastomer polymer composition, particularly by means of the addition of a reactive plasticizer, according to the invention. Furthermore, the cross-linking density is dependent on the energy dose D supplied by means of the electron beam device.

In order to produce a sufficiently high cross-linking density, an energy dose of more than 15 kGy (kilogray), preferably of more than 40 kGy, is provided. The energy dose results from the quotient of the absorbed radiation energy and the mass of the film material. Usually, saturation of the cross-linking density is observed after a certain value D. Furthermore, there is the risk that in the case of overly strong irradiation, undesirable fragmentation of the polymer chains takes place. It is therefore practical to select an energy dose D that maximally amounts to approximately 100 kGy, as a function of the structure and thickness of the film.

The electron beam voltage determines the electron penetration depth and has an influence on the electron penetration curve. At low voltages, the secondary electrons only penetrate into the uppermost substrate layers. At an overly high voltage, it can happen that the electrons impacting the upper layers are too fast and therefore do not trigger any cross-linking reaction. In order to achieve uniform cross-linking behavior over the substrate cross-section, the ionization of the uppermost and lowermost layers should be balanced out as much as possible. The penetration depth of the electrons is preferably established in such a manner, by means of selecting the acceleration voltage, that an ionization of at least 90% is present in the uppermost and lowermost film layer.

The gel content of films has been studied before and after electron beam cross-linking. While non-irradiated films had a gel content of 30 to 37%, a gel content of 67 to 74% was measured for the films irradiated with a dose of 100 kGy (according to ISO 579).

During irradiation with electrons, the treated material is usually only heated slightly, in contrast to irradiation with UV light. Nevertheless, it can be provided, within the scope of the invention, that the extruded film is passed over a cooling roller in the electron beam device.

DETAILED DESCRIPTION OF THE PREFERRED EMBODIMENT

The invention will now be described with reference to the following Examples. These examples are for illustration only and do not limit the scope of the invention.

EXAMPLE 1

Co-extrusion films were produced, which had an elastomer core layer as well as outer layers of polypropylene, having a thickness of 4 μm (micrometers), and were cross-linked by means of electron beams. Elastomer polymer compositions with and without the addition of a reactive plasticizer were studied. The reactive plasticizer was varied in terms of type and amount. The following variations were made:

Film 1: Film Thickness 65 μm
    elastomer polymer composition without the addition of a reactive plasticizer Film 2: Film Thickness 65 μm
    elastomer polymer composition of film 1 with an addition of 2.5 wt.-% methacrylate-terminated butadiene (mole mass 4450 g/mol; viscosity 100,000 mPas (27° C.))

Film 3: Film Thickness 40 μm
    elastomer polymer composition without the addition of a reactive plasticizer Film 4: Film Thickness 40 μm
    elastomer polymer composition of film 3 with an addition of 5 wt.-% multi-functional polyester acrylate (viscosity 300 to 900 mPas (25° C.))

Film 5: Film Thickness 40 μm
    elastomer polymer composition of film 3 with an addition of 5 wt.-% acrylate polybutadiene (viscosity 80,000 mPas (25° C.))

The subsequent electron beam cross-linking took place with a radiation intensity of 100 kGy. For a comparison, two non-cross-linked films having the film formulations 1 and 3 were produced.

The cross-linked and non-cross-linked films were pre-stretched with an elongation value of 500%. Elongation measurements were carried out on the pre-stretched films. In the elongation measurements, the films were stretched by 50%, 100%, and 200%, one after the other, and the elongation force was measured. Afterwards, the film was relaxed to an elongation value of 30%, and the elongation force was measured once again. After complete relaxation, the remaining residual elongation was measured. The measurement results are reproduced in the table below.

|  |  | Film 1 | Film 2 | Film 3 | Film 4 | Film 5 |
|---|---|---|---|---|---|---|
| Irradiation intensity | [kGy] | 0 | 100 | 100 | 0 | 100 | 100 | 100 |
| Elongation 50% | [N/inch] | 1.2 | 1.43 | 1.59 | 0.83 | 0.94 | 1.01 | 0.98 |
| Elongation 100% | [N/inch] | 1.51 | 1.84 | 2.8 | 1.06 | 1.21 | 1.34 | 1.26 |
| Elongation 200% | [N/inch] | 1.98 | 2.67 | 3.12 | 1.53 | 1.95 | 2.16 | 2.09 |

-continued

|  |  | Film 1 | Film 2 | Film 3 | Film 4 | Film 5 | | |
|---|---|---|---|---|---|---|---|---|
| Relaxation to 30% elongation | [N/inch] | 0.34 | 0.39 | 0.44 | 0.16 | 0.19 | 0.2 | 0.21 |
| Remaining elongation | [%] | 2.3 | 2.7 | 2 | 2.1 | 1.9 | 2.9 | 2.44 |

On the basis of the measured values determined for non-irradiated and irradiated film samples, it was possible to clearly improve the strength values of the cross-linked films by means of adding reactive plasticizers.

EXAMPLE 2

In another experiment, the influence of the electron beam voltage on the electron penetration depth during electron beam cross-linking was investigated. A film sample having a thickness of 65 µm was used as the basis. At an electron beam voltage of 170 kV, an ionization of 99% was found in the uppermost layer, and an ionization of 92% was found in the lowermost layer. At a setting of 140 kV, this ionization behavior shifts. The uppermost film layer then has a value of 99%, and the lowermost layer has a value of 66%. At this setting, uniform cross-linking throughout the film is not guaranteed.

Accordingly, while only a few embodiments of the present invention have been shown and described, it is obvious that many changes and modifications may be made thereunto without departing from the spirit and scope of the invention.

What is claimed is:

1. An elastic film comprising:
   at least one layer that is produced by extrusion of an elastomer polymer composition and subsequently cross-linked by treatment with electron beams,
   wherein the elastomer polymer composition contains a mixture of 40 to 90 parts by weight of a styrene block copolymer, 5 to 50 parts by weight of a plasticizer oil, up to 10 parts by weight of a thermoplastic polymer, and 2 to 20 parts by weight of a reactive plasticizer that has a mole mass of less than 10,000 kg/kmol, is compatible with soft segments of the styrene block copolymer, and has functional acrylate groups.

2. An elastic film according to claim 1, wherein the plasticizer is selected from the group consisting of a methacrylate-terminated butadiene, methacrylate butadiene, a multi-functional polyester acrylate, and acrylate polybutadiene.

3. An elastic film according to claim 1, wherein the reactive plasticizer has a viscosity of less than $10^5$ mPas, measured with a Brookfield viscosimeter at 25° C.

4. An elastic film according to one of claim 1, wherein the plasticizer is a low-viscosity oligomer.

5. An elastic film according to claim 1, wherein the elastomer polymer composition contains a thermoplastic polymer selected from the group consisting of polystyrenes, ethylene/vinyl acetate copolymers, and polyolefins.

6. An elastic film according to claim 1, wherein the film has at least one outer layer co-extruded with the elastomer polymer composition, said outer layer being made of a polymer selected from the group consisting of polyethylene, polyethylene copolymer, propylene; propylene copolymer, and a mixture of these polymers.

7. An elastic film according to claim 1, wherein after first elongation of the elastic film by 200% and subsequent relaxation, a remaining non-elastic increase in length of the film is less than 3%.

8. A method for the production of an elastic film comprising:
   extruding a first layer of an elastomer polymer composition that contains 40 to 90 parts by weight of a styrene block copolymer, 5 to 50 parts by weight of a plasticizer oil, up to 10 parts by weight of a thermoplastic polymer, and 2 to 20 parts by weight of a reactive plasticizer that has a mole mass of less than 10,000 kg/kmol, is compatible with soft segments of the styrene block copolymer, and has functional acrylate groups, as a mono-film, or co-extruding said first layer with at least one additional layer as a multi-layer film;
   passing the film to an electron beam device; and
   irradiating the layer that consists of the elastomer polymer composition with energy-rich electrons with the electron beam device to accomplish cross-linking of the polymer composition.

9. A method according to claim 8, wherein the film is exposed to an energy dose D of more than 15 kGy (kilogray) in the electron beam device.

10. A method according to claim 8, wherein penetration depth of the electrons is established by selecting acceleration voltage such that an ionization of at least 90% is present in an uppermost and lowermost film layer.

11. A method according to claim 8, wherein the extruded film is passed over a cooling roller in the electron beam device.

* * * * *